United States Patent Office 3,556,607
Patented Jan. 19, 1971

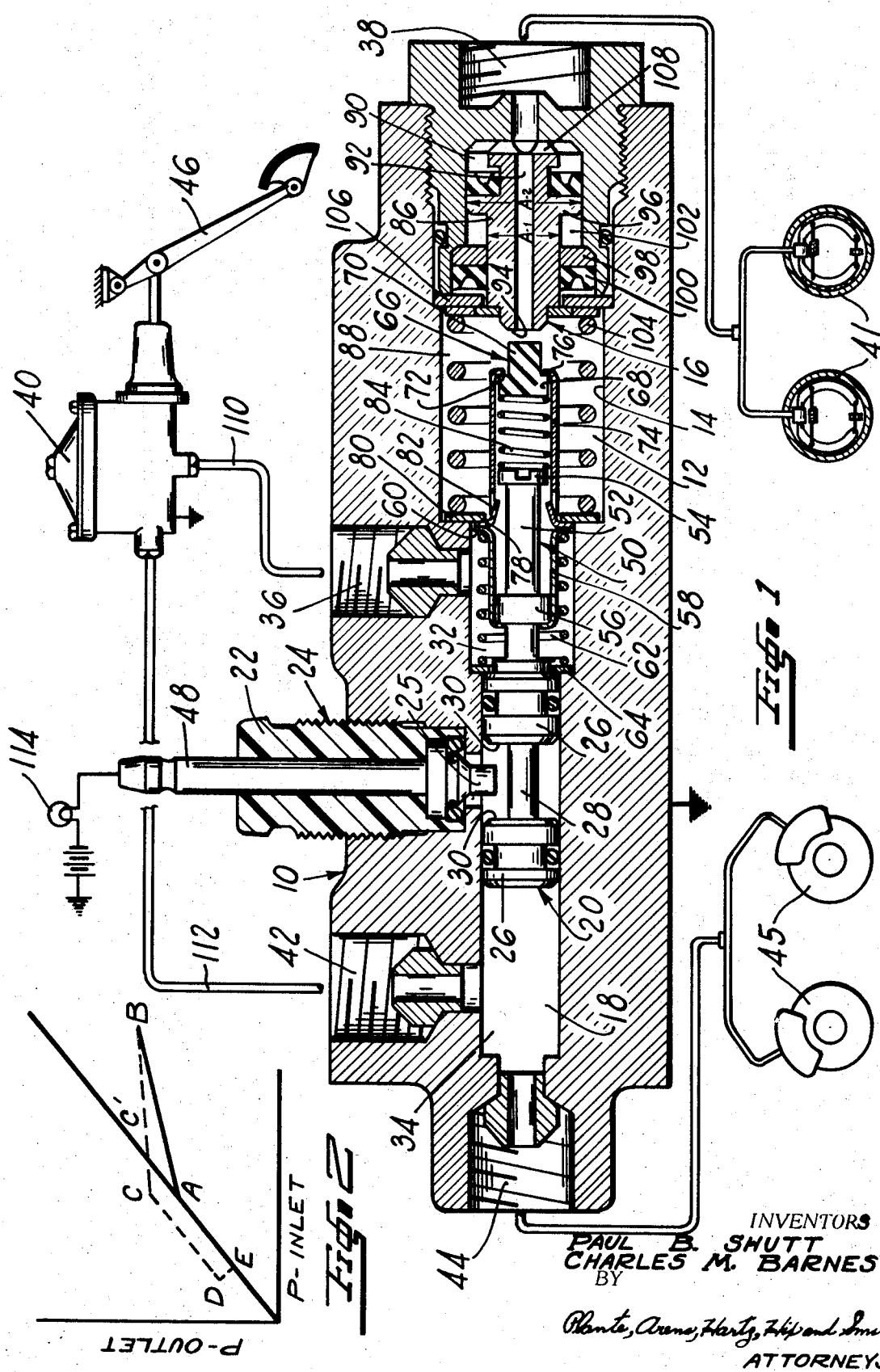

3,556,607
COMBINATION PROPORTIONING AND BYPASS VALVE
Paul B. Shutt and Charles M. Barnes, St. Joseph, Mich., assignors to The Bendix Corporation, a corporation of Delaware
Filed June 11, 1969, Ser. No. 832,162
Int. Cl. B60t 8/26, 15/00, 17/22
U.S. Cl. 303—6                                    6 Claims

ABSTRACT OF THE DISCLOSURE

A brake failure warning device and a brake proportioning valve are provided in a single housing. During normal brake applications, the proportioning valve reduces the braking effort of the rear wheels as compared to the front wheels. The warning device and proportioning valve are interconnected in such a manner that a failure in the front brake hydraulic system not only actuates a warning device in the driver's compartment but also holds the proportioning valve open to permit the rear wheels to deliver their maximum braking effort.

BACKGROUND OF THE INVENTION

This invention relates to a proportioning valve for use with a vehicular braking system.

As is well known to those skilled in the brake art, during deceleration of a vehicle, a substantial portion of the vehicle's weight is transferred from the rear wheels to the front wheels due to rotation of the vehicle about its center of mass. Therefore, the front wheel brakes perform a substantially greater proportion of the braking effort than do the brakes on the rear wheels. For this reason, the wheel cylinders and other components of the front wheel brakes are sized to reflect this difference in braking effort. While this difference in size is sufficient to overcome the effect of the weight transfer during light braking or ordinary stopping, it is insufficient to compensate for the extremely rapid weight transfer during a rapid deceleration. For this reason, it is necessary to incorporate a proportioning valve in the rear baking system to decease the hydraulic pressure applied to the rear brakes during a rapid deceleration. While the problem is particularly acute in vehicles employing disc brakes on the front wheels and drum brakes on the rear wheels, and therefore, proportioning valves are most often used on vehicles having this type of braking system, the problem exists on vehicles having drum brakes or disc brakes on all four wheels.

However, if the front wheel braking system should fail, it is necessary to stop the vehicle using the rear brakes alone. Since the proportioning valve in the rear brake system substantially reduces the braking effort of the rear brakes, it is desirable that the effect of the proportioning valve be eliminated from the system so that maximum braking effort may be obtained from the rear wheel brakes when they alone are used to stop the vehicle. To perform this function, a device actuated by a pressure differential between the front and rear braking systems is necessary to enable fluid pressure in the rear braking system to bypass the proportioning valve upon a failure of the front brakes.

SUMMARY OF THE INVENTION

It is an important object of my present invention to provide a proportioning valve which is sensitive to a pressure differential between the front and rear braking systems to render the proportioning valve ineffective upon a failure in the front brakes to permit fluid pressure in the rear system to communicate directly with the wheel cylinders in the rear brakes.

Another important object of my invention is to provide a device that negates the effect of the proportioning valve during a failure in the front braking system, but which resets itself automatically upon repair of the system to reestablish the proportioning effect.

Yet another important object of my invention is to provide a proportioning valve, a mechanism to bypass the proportioning valve, and a warning switch to indicate a failure in the braking system in a single housing.

DESCRIPTION OF THE DRAWINGS

FIG. 1 is a longitudinal cross sectional view of a warning switch and a proportioning valve made pursuant to the teachings of my present invention; and FIG. 2 is a graphical representation of the operation of the device illustrated in FIG. 1.

DETAILED DESCRIPTION

Referring now to the drawing, a housing 10 defines a bore 12 having a larger diameter portion 14 containing a proportioning valve generally indicated at 16 and a smaller diameter portion 18 in which a piston 20 reciprocates. A warning switch housing 22 is carried by the housing 10 and contains a warning switch 24 of a type well known to those skilled in the art that actuates a warning device 114 when the piston 20 is shifted into contact with a switch arm 25 that projects into the bore 12. The piston 20 has a pair of opposed faces 26 interconnected by a web 28 spaced from the walls of the bore 18 to present a pair of shoulders 30 between the web 28 and each of the faces 26. First and second chambers 32 and 34 are defined in the bore 14 by the respective faces 26 and corresponding ends of the bore. An inlet 36 and an outlet 38 are connected to a first hydraulic system 110 to communicate the chamber 32 with one side of a split system master cylinder 40 and with the rear brakes 41. An inlet 42 and an outlet 44 are connected to a second hydraulic system 112 to communicate the chamber 34 with the other side of the master cylinder 40 and with the front brakes 45. Fluid pressure is developed in the master cylinder 40 by a pedal 46 located in the operator's compartment of the vehicle. A contact 48 extends from the housing 22 and is connected to an electrical circuit that actuates a warning signal 114 upon actuation of the warning switch 24.

A plunger 50 is secured to the piston 20 and extends through the chamber 32 into the larger diameter portion 14 of the bore 12. Plunger 50 includes a stem 52, a head 54 and an enlarged portion 56. A cage 58 engages the enlarged portion 56 and extends coaxially with the plunger 50 terminating in a flange portion 60. A spring 62 engages one side of a retainer ring 64 which is engaged on its other side of the piston 20. Cage 58, spring 62, and retainer ring 64 cooperate with each other to center the piston 20 in the bore when equal pressure acts on each of the faces 26, thereby preventing the piston 20 from inadvertently actuating the switch 24.

The construction of the proportioning valve 16 will now be described. An annular, resilient valve seat 66 has a larger diameter portion 70 with a shoulder 72 therebetween. Valve seat 66 is reciprocable in the bore 14 and is carried by a sleeve 74 having a radially inwardly projecting flange portion 76 on one end thereof that engages the shoulder 72 to limit movement of the seat 66. A radially outwardly projecting flange 78 is formed on the other end of the sleeve 74 and abuttingly engages a retainer ring 80 mounted in the bore 14. A pair of inwardly extending arms 82 are provided on the sleeve 74 and are adapted to engage the head 54 during movement of the plunger toward the other end of the sleeve 74. Coupling means or arms 82 permit relative movement between the plunger 50 and sleeve 74 during movement of the plunger toward the seat 60 and during movement of the plunger toward the other end until the arms 82 engage the head 54, whereupon the plunger 50 and sleeve 74 move together as a unit. A spring 84 is interposed between the head 54 and the valve seat 66 to yieldably maintain the latter in engagement with the flange 76 and, assisted by the spring 62 and cage 58, to yieldably bias the flange 78 into engagement with the ring 80.

Valve 16 further includes a valve piston 86 that cooperates with the valve seat 66 to divide the large diameter bore 14 into an inlet chamber 88 and an outlet chamber 90. The piston 86 has a central bore 92 to permit fluid communication between the inlet and outlet chambers when the piston is disposed in the bore such that an annular sealing area 94 on one end of the piston does not abut the valve seat 66. A radially projecting, circumferentially extending shoulder 96 extends from the piston 86 and is adapted to engage a stop ring 98 mounted in the bore 14 to limit the travel of the piston 86. Appropriate seals 100 are provided to prevent fluid from leaking into a cavity 102. A spring 104 is interposed between the ring 80 and a washer 106 force-fitted on the one end of the piston 86 to yieldably maintain the other end 108 of the piston 86 into engagement with the wall of the housing 10.

MODE OF OPERATION

Assuming normal operation of the brakes, the operator depresses the pedal 46 to build up pressure in the master cylinder 40 to pressurize the chambers 32 and 34. Unless a failure occurs in one of the hydraulic systems 110 or 112, pressure in chamber 32 will equal the pressure in chamber 34, thereby maintaining the piston 20 centered with respect to the warning switch 24.

FIG. 1 illustrates the brake release position of the various parts of the proportioning valve 16. Fluid enters the inlet chamber 88, flows through the bore 90 to the outlet 90 and through the outlet port 38 to the rear wheels 41. Initially, fluid pressure in chamber 88 equals the pressure in chamber 90. However, since fluid pressure in chamber 90 acts across the entire area $A_2$ and the pressure in chamber 88 acts against the much smaller area $A_1$, an imbalance of forces acts on the piston 86 although the fluid pressure in the chambers 88 and 90 is equal. When this force imbalance exceeds the force of the spring 104, the piston 86 moves to the left viewing FIG. 1 until the annular area 94 sealingly engages valve seat 66 to close fluid communication between the inlet and outlet chambers 88 and 90, through the central bore 92. This point is represented by A in FIG. 2.

After the initial closing of the valve, a pressure increase in the inlet chamber 88 will partially reopen the valve to admit more fluid to the outlet chamber 90. However, due to the differential area $A_2$ over $A_1$, only a fraction of the pressure increase in the chamber 88 will occur in the chamber 90 before the valve 16 recloses. Thus a lower pressure lever is established in the chamber 90 than exists in the chamber 88. This proportioning effect of the valve is represented by line A–B on FIG. 2.

Point B represents the state where the vehicle operator reduces pressure on the pedal 46 to cause a decrease of fluid pressure in the inlet chamber 88. A force imbalance is thus established on the piston 56, forcing the latter and the valve seat 66 to the left viewing FIG. 1 to compress the springs 84 and 104. As the piston 86 and seat 66 move into the inlet chamber 88, the volume of the outlet chamber 90 increases, thereby reducing the fluid pressure therein. This action of the valve is represented by line B–C on FIG. 1.

As further reductions of inlet pressure and the subsequent expansion of the outlet chamber 90 occur, a state will be reached in which the pressure in the outlet chamber 90 equals the pressure in the inlet chamber 88, represented by C' in FIG. 2. Also, at some point during the expansion cycle represented by line A–C on FIG. 1, the force due to fluid pressure acting on the area $A_2$ will equal the force due to fluid pressure acting on the area $A_1$ plus the force of the spring 104. Preferably, spring 104 is sized so that the forces balance at the same time that the pressures in chambers 88 and 90 equalize, as represented by C' on FIG. 2. At this time the piston 86 and seat 66 discontinue their movement into the chamber 88. Further reductions of inlet pressure will cause the pressure in chamber 88 to drop below the pressure in chamber 90. When the force created by this pressure differential acting on the small diameter portion 70 of seat 66 is great enough to overcome the force of the spring 84, valve seat 66 lifts off the sealing surface 94, permitting fluid communication between the chambers 88 and 90 through the bore 92, as represented by line C–D on FIG. 1. When the force due to fluid pressure acting on area $A_2$ is reduced still further to a value below the force of the spring 104, the piston will be returned to its initial position as seen in FIG. 1, thus fully opening the valve 16, as represented by E in FIG. 2.

During the braking cycle as described above, pressure in the chamber 34 is equal to the pressure in chamber 32; thus the piston 20 remains in the position illustrated in FIG. 1 due to the effect of the spring 62, cage 58 and plunger 50. However, should a malfunction occur in the front brake hydraulic system 110, pressure in chamber 34 would decrease. The higher pressure in chamber 32 acting on the piston 20 shifts the latter to the left viewing FIG. 1. The shoulder 30 then engages the switch arm 25 connecting the latter with the grounded housing 10 to complete a circuit actuating a warning device 114 in a manner well known to those skilled in the art.

Shifting of the piston 20 also engages the head 54 of plunger 50 with the arms 82 and therefore forces sleeve 74, seat 66 and spring 84 to the left viewing FIG. 1 against the bias of the spring 62. Simultaneously, increasing pressure in the chambers 88 and 90 shifts the piston 86 to the left as described above. However, the piston 86 cannot engage the valve seat 66 since the latter has been carried to the left viewing FIG. 1 by the piston 20 and the engagement of the shoulder 96 with the stop ring 98 prevents the piston 86 from following the seat 66. Fluid communication between the chambers 88 and 90 through the central bore 92 is therefore permitted regardless of the pressure level in the respective chambers. Thus, the proportioning function of the valve 16 is eliminated during a failure in the front brake hydraulic system to permit the rear brakes to deliver their maximum braking effort. After the system is repaired, the first normal brake application will recenter the piston 20, returning the valve seat to the position illustrated in FIG. 1, thus resuming rear brake proportioning.

What is claimed is:

1. In a vehicular brake system having first and second hydraulic systems:
   a housing having an inlet, an outlet, and a bore communicating the inlet with the outlet;
   a first valve member slidable in said bore between said inlet and outlet;
   a second valve member shiftable in said bore from a first position cooperating with said first valve member to restrict flow of fluid from the inlet to the outlet during increasing fluid pressure at said outlet to a second position wherein unrestricted flow of fluid is permitted from the inlet to the outlet;
   a piston shiftable in said bore having a pair of opposed faces;
   each of said first and second hydraulic systems being in communication with one of said faces whereby a pressure differential will shift the piston;
   a sleeve slidable in said bore;
   said second valve member being carried on one end of said sleeve; and
   a plunger mounted for reciprocation with said piston;
   means for engaging the plunger with the sleeve;

stop means carried in said bore;
said sleeve having a radially projecting flange cooperating with said stop means to limit movement of the sleeve in the bore to thereby establish said first position.

2. The invention of claim 1:
said stop means being a ring mounted in the bore coaxially with the sleeve; and
resilient means yieldably biasing said flange into engagement with said ring.

3. In a vehicular brake system having first and second hydraulic systems:
a housing having an inlet, an outlet, and a bore communicating the inlet with the outlet;
a first valve member slidable in said bore between said inlet and outlet;
a second valve member shiftable in said bore from a first position cooperating with said first valve member to restrict flow of fluid from the inlet to the outlet during increasing fluid pressure at said outlet to a second position wherein unrestricted flow of fluid is permitted from the inlet to the outlet;
a piston shiftable in said bore having a pair of opposed faces;
each of said first and second hydraulic systems being in communication with one of said faces whereby a pressure differential will shift the piston;
a sleeve slidable in said bore;
said second valve member being carried on one end of said sleeve;
a plunger mounted for reciprocation with said piston; and
means for engaging the plunger with the sleeve;
said sleeve slidingly and telescopingly receiving said plunger;
said plunger having a stem portion secured to said piston and extending into said sleeve and a head portion in said sleeve presenting an abutment with said stem portion;
said engaging means being an inwardly extending projection on said sleeve adapted to engage said abutment during movement of said plunger toward said other end but ineffective to engage said abutment upon movement of the plunger toward said one end whereby movement of the plunger toward said other end is permitted until the arms engage the abutment whereupon the plunger and the sleeve move together as a unit.

4. The invention of claim 3:
stop means carried in the bore;
said sleeve having a radially projecting flange portion cooperating with said stop means to limit movement of the sleeve in the bore to thereby establish said first position; and
resilient means yieldably biasing said flange into engagement with said stop means.

5. The invention of claim 4:
said resilient means being a spring interposed between said head and said one end.

6. In a vehicular braking system having first and second hydraulic systems:
a housing having an inlet, an outlet, and a bore communicating the inlet with the outlet;
a piston shiftable in said bore defining first and second hydraulic chambers in fluid communication with said first and second hydraulic systems between opposite ends of the piston and corresponding ends of the bore;
a flow control valve disposed in one of said chambers;
said flow control valve including first valve means slidable in said bore and second valve means shiftable in said bore from a first position cooperating with said first valve means to restrict flow of fluid from the inlet to the outlet during increasing fluid pressure at said outlet to a second position wherein unrestricted flow of fluid is permitted from the inlet to the outlet; and
a stem extending from said piston into said one chamber;
said second valve means including a sleeve telescopingly receiving a portion of said stem, and a valve member on one end of the sleeve for engagement with said first valve means;
said stem having a head portion within said sleeve cooperating with said stem to define a shoulder therebetween;
said sleeve having inwardly projecting means for engagement with said shoulder upon shifting of the piston due to a reduction in pressure in the other chamber, to permit said piston to shift said second valve means to said second position.

References Cited
UNITED STATES PATENTS

| | | | |
|---|---|---|---|
| 3,441,318 | 4/1969 | Bueler | 303—6 |
| 3,450,443 | 6/1969 | Bueler | 303—6 |
| 3,464,741 | 9/1969 | Falk | 303—6 |
| 3,472,559 | 10/1969 | Bueler | 303—6 |

MILTON BUCHLER, Primary Examiner

J. J. McLAUGHLIN, JR., Assistant Examiner

U.S. Cl. X.R.

60—54.5; 188—152; 200—82; 303—84